United States Patent [19]

Lein et al.

[11] Patent Number: 5,034,062

[45] Date of Patent: Jul. 23, 1991

[54] USE OF ACID-CONTAINING ANIONIC EMULSION COPOLYMERS AS CALCINED CLAY SLURRY STABILIZERS

[75] Inventors: George M. Lein, Chalfont; Robert C. Mahar, Pennsburg, both of Pa.

[73] Assignee: Rohm and Haas Company, Phila., Pa.

[21] Appl. No.: 571,802

[22] Filed: Aug. 23, 1990

[51] Int. Cl.$^5$ ................ C08F 222/16; C08F 222/2.10
[52] U.S. Cl. .................................... 106/416; 106/487;
106/499; 106/486; 252/363.5; 427/391;
526/932; 524/447; 501/146; 501/147; 501/148;
501/149
[58] Field of Search ............... 106/416, 486, 487;
526/932; 524/447; 427/391; 501/148, 149, 147,
146

[56] References Cited

U.S. PATENT DOCUMENTS 3,966,687  6/1976  Ribba ................................ 526/932
4,299,710 11/1981  Dupre et al. ...................... 252/8.51
4,374,203  2/1983  Thompson et al. ................ 106/487
4,517,098  5/1985  Hann et al. ......................... 501/148

OTHER PUBLICATIONS

CA 113(12): 98541b; "Swelling and Dissolution of Latex Dispersions of the Ethylacrylate–Methacrylicacid Copolymers During Alkylation"; Quadrat, 1990; Coll. Poly. Sci 268(6), 493–9.

*Primary Examiner*—William R. Dixon, Jr.
*Assistant Examiner*—Scott L. Hertzog

[57] ABSTRACT

A stabilized aqueous suspension of calcined clay and a method for preparing the same are provided. The method involves an aqueous suspension of calcined clay containing at least 10% by weight clay, and at least 0.05% by weight of a high charge density crosslinked or uncrosslinked acid containing alkali-soluble acrylic copolymer.

24 Claims, No Drawings

USE OF ACID-CONTAINING ANIONIC EMULSION COPOLYMERS AS CALCINED CLAY SLURRY STABILIZERS

FIELD OF THE INVENTION

This invention relates to stable clay slurries and particularly to slurries of calcined kaolin clay. More particularly, this invention relates to the use of crosslinked or uncrosslinked acid containing alkali-soluble acrylic copolymers, or combinations thereof, to achieve stable calcined kaolin slurries such that said slurries can be shipped and/or stored without the harmful effects of dilatant settling.

BACKGROUND OF THE INVENTION

Kaolin, a naturally occurring form of hydrated aluminum oxide commonly known as hydrated clay, is widely used in paper coatings, as a filler in paper manufacture, as a paint additive, and in coatings for wire and cable. For many applications, the kaolin clay must first be calcined in order to take on certain desirable characteristics. Raw kaolin or aqueous kaolin slurries are calcined, i.e. brought to an elevated temperature, such that the clay loses its water of hydration and becomes a powdered solid. It is the calcined kaolin which has the desirable properties of increasing the whiteness and raising the level of opacity of materials coated with it.

Calcined kaolin clay retains its desirable properties even after it is reslurried. Since calcined kaolin is used in large quantities as an aqueous slurry, it is desirable to be able to ship it as a high solids aqueous slurry. Unfortunately, these slurries are fairly unstable.

Calcined clay particles have a highly irregular shape which is responsible for their property of increasing opacity. However, this irregular shape is also a major cause of calcined clay slurry instability. As a calcined clay slurry is agitated, the irregularly shaped particles sweep out an abnormally large volume, thereby increasing the statistical likelihood of particles colliding, forming agglomerates and settling out. This is known as dilatant settling. Dilatant settling and slurry instability result in the formation of hard-pack solids precipitation. This hard-pack renders the slurry useless as an article of commerce and potentially damaging to piping, pumps, and other slurry handling mechanical equipment.

The large volume swept out by the particles also dramatically increases the high shear viscosity of calcined clay slurries. This high shear viscosity, characteristic of calcined clay slurries, presents major handling problems for the industry because the calcined clay slurries are applied to substrates under high shear conditions. In order to prevent the effects of dilatancy on slurry viscosity and slurry stability, the level of solids of a calcined kaolin clay slurry must be kept low (40 to 50% by weight) relative to non-calcined clay slurries which can have levels of clay solids of about 70% by weight.

These problems have been the subject of extensive research and have been long standing problems for the calcined clay industry. U.S. Pat. No. 4,017,324 teaches the use of 8 to 33.5% hydrated kaolin clay along with a suspending agent, such as bentonite clay, hydroxyethyl cellulose, methyl cellulose, carboxymethyl cellulose, and a dispersing agent such as a non-ionic surfactant, an anionic surfactant, and alkanolamine or the sodium salt of a polymeric carboxylic acid.

U.S. Pat. No. 4,374,203 discloses the use of anionic polymers and copolymers in combination with cationic polymers as a means of controlling calcined clay slurry viscosity and stability. The examples contained in that patent which use only an anionic copolymer do not show any advantage with regard to decreasing the dilatancy of the slurries.

Those approaches are only somewhat effective in solving the problems of calcined kaolin clay slurry stability and dilatancy. Also, since these methods involve the use of two or more compounds to achieve stable slurries, they present manufacturing difficulties and increased costs. In addition, dilatant settling may still occur, resulting in unusable slurries.

We have found ways to prepare calcined clay slurries which solve the problems mentioned above. Stable calcined clay slurries can be made containing at least 10% by weight calcined clay solids by adding to said slurries an effective amount of anionic acrylic emulsion copolymer.

It is an object of this invention to provide a method of preparing stable aqueous slurries of clay, especially calcined kaolin clay, which do not exhibit dilatant settling even after prolonged storage without agitation, and which can be pumped without suffering the effects of dilatancy.

SUMMARY OF THE INVENTION

This invention is directed to the use of an acid-containing, high charge density, alkali-soluble, anionic copolymer as a clay slurry stabilizer.

DETAILED DESCRIPTION OF THE INVENTION

We have discovered that the use of high charge density, acid-containing, alkali-soluble copolymers, which are either crosslinked or not crosslinked, are superior calcined clay slurry stabilizers in both their performance and because they obviate the need for additional dispersing agents.

Acid-containing, alkali-soluble emulsion copolymers are particularly well suited to preparing stable suspensions and dispersions of calcined clay. The stable slurries of this invention contain from 10 to 52%, and more preferably from 48 to 50% by weight of calcined clay.

In the pH range in which calcined clay slurries are made, from about pH 6 to about pH 8, there is a positive charge on the edges of the calcined clay particles. Acid-containing, anionic copolymers with high charge density which have been at least 50% neutralized can readily adhere to the surfaces of the clay particles and thereby act to inhibit agglomeration and dilatant settling.

In addition, when the copolymers are alkali-soluble emulsions and are subjected to an aqueous solution of a controlled pH, the polymer chains uncoil. When uncoiled, polymer chains of sufficient length serve to thicken the slurry and enhance slurry stability. This can be accomplished by adjusting the pH in the range from about pH 6 to about pH 8, with about pH 7 being preferred. The pH can be adjusted by the addition of caustic, such as sodium hydroxide, ammonium hydroxide, aluminum hydroxide or soda ash.

It has been found that is beneficial to have some hydrophobic character in the copolymer to enhance the compatibility of the copolymer with other organic compounds which may be present in the slurry (other stabilizers, dispersants, pigments, etc.). Hydrophobic character also enhances adsorption of the stabilizer on the hydrophobic surfaces of the calcined clay particles. Thus, while a polymer like polyacrylic acid may have a very high charge density, it lacks the degree of hydrophobic character necessary to make it an effective calcined clay slurry stabilizer. However, because of the large positive surface charge of calcined clay particles, it is desirable to have a significant amount of anionic character present in the copolymer.

The copolymers used in this invention are alkali-soluble acrylic emulsion copolymers with high acid contents. The copolymers are composed to form about 30% to about 60%, more preferably from about 33% to about 37% by weight of the total polymer concentration of polymerized monomeric units of unsaturated noncarboxylic acids including alkyl esters of acrylic or methacrylic acids such as ethyl acrylate, butyl acrylate, methyl methacrylate, ethyl methacrylate, butyl methacrylate, isobutyl methacrylate, hydroxyethyl methacrylate, hydroxypropyl methacrylate, hydroxyethyl acrylate, and hydroxypropyl acrylate. The more preferred unsaturated noncarboxylic acid is ethyl acrylate.

Preferred comonomers include monoethylenically unsaturated monocarboxylic acids containing from 3 to 6 carbon atoms per molecule and include acrylic acid, methacrylic acid, vinyl acetic acid, crotonic acid and acryloxypropionic acid. The more preferred monoethylenically unsaturated monocarboxylic acid is methacrylic acid. The concentration of these monomeric units in this invention is from about 70% to about 40%, and preferably from about 67% to about 63% by weight of the total polymer concentration. The copolymer used in this invention can be polymerized using emulsion techniques well known to those skilled in the art.

It has been discovered that copolymers with high charge density are effective stabilizers for calcined clay slurries with regard to settling and dilatancy. The charge density of the copolymers are quantitatively defined in terms of the acid equivalent weight of solids (AEWS). AEWS is the weight of polymer solids needed to neutralize one equivalent of base (i.e. 40 g NaOH). Therefore, as the charge density increases, the AEWS value decreases. The AEWS values are determined by dividing the formula weight of the acid component by the relative amount of that component in the polymer. The copolymers used in this invention have AEWS values below 200 and more preferably below 150. Thus, for example, the AEWS value of a copolymer of 35% ethyl acrylate and 65% methacrylic acid, which is a suitable copolymer for use in slurries of the present invention, is calculated as follows:

AEWS = Form. Wt. of MAA ÷ Rel. Amt. of MAA

AEWS = 86 ÷ 0.65 = 132

Thus, it takes 132 g. of this copolymer to neutralize one equivalent of base in the manner described above. As a comparative example, a copolymer having a high AEWS value, therefore, a low charge density, is Acrysol ® ASE-60 crosslinked acrylic emulsion copolymer. Acrysol ® ASE-60 has an AEWS value of 215. Thus, it takes 215 g. of Acrysol ® ASE-60 copolymer to neutralize one equivalent of base in the manner described above.

The copolymers used in this invention are alkali-soluble emulsion copolymers with high acid contents. High molecular weight copolymers necessary, at least 250,000 and preferably at least 500,000, are easily prepared as emulsions. Since non-emulsion copolymers of that molecular weight tend be in the form of a gel, it is very difficult to economically prepare them as solution polymers.

The copolymers used in this invention can be crosslinked, provided that they are not crosslinked to such an extent that the polymer network is insoluble. Either crosslinked or non-crosslinked copolymers will serve to stablize suspensions and dispersions of calcined clay when present in amounts of from about 0.05% to about 1.0% by weight polymer solids on clay solids. More preferred are levels of copolymer from about 0.10% to about 0.25% by weight polymer solids and the most preferred is a copolymer level of about 0.20% by weight polymer solids.

While it may be economically advantageous to make slurries at the highest clay solids possible, it is characteristic of calcined clay slurries to exhibit very steep rises in high shear viscosity at clay solids above 50%, making pumping and mixing operations unmanageable. For this reason, the calcined clay slurries of the illustrative examples are made at 50% calcined clay solids by weight except where otherwise indicated.

Stable calcined clay slurries of this invention can be made as either dispersed or non-dispersed slurries. Dispersed slurries may contain dispersing agents such as polyacrylic acid, sodium hexametaphosphate, sodium tripolyphosphate, tetrasodium pyrophosphate, sodium silicate, anionic polymers, anionic surfactants, nonionic surfactants, citric acid and salts thereof, ascorbic acid and salts thereof, alkali and alkanolamine soaps of fatty acids, other dispersing agents well known to those skilled in the art or combinations thereof.

When used in dispersed calcined clay slurries, high charge density alkali-soluble acrylic emulsion copolymers also show an increase in performance over polymers or copolymers with low charge density. Whether the slurries are dispersed with sodium hexametaphosphate or a 3,000 molecular weight homopolymer of acrylic acid, when they were stabilized with the higher charge density alkali-soluble acrylic emulsion copolymers, the stability of the slurries is enhanced.

The pH of the slurries of the following examples is in the range from about pH 6 to about pH 8, with about pH 7 being preferred. The pH is adjusted by the addition of sodium hydroxide.

The slurries of this invention are useful as paper coatings, as fillers in paper manufacture, as paint additives, and as coatings for wire and cable.

The advantages of the present invention are illustrated in the following examples.

EXAMPLE 1 (COMPARATIVE)

Slurry 1: To 196.0 g. of water were added 50.0 g. of 0.75% (solids basis) carboxymethyl cellulose solution, 1.94 g. of 10% (solids basis) sodium hydroxide, and 0.6 g. of acrylic acid homopolymer in the sodium salt from having molecular weight of 3,000. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The viscosity and test results appear in Table I.

EXAMPLE 2 (CONTROL)

Slurry 2: To 196.0 g. of water were added 50.0 g. of 0.75% (solids basis) carboxymethyl cellulose solution. This mixture was stirred at low shear (low setting on a Waring Blender or 1,000 rpm on a Cowles mixer) and 250 g. of calcined kaolin clay was added slowly while mixing. While mixing, enough of a 10% (by weight) sodium hydroxide solution was added to bring the pH of the slurry to the desired range. The slurry was then stirred at high shear (high setting on a Waring Blender or 3,000 rpm on a Cowles mixer) for a sufficient time to achieve a homogeneous slurry. The viscosity and test results appear in Table I.

EXAMPLE 3 (COMPARATIVE)

Slurry 3: 1.22 g. of 10% (by weight) sodium hydroxide was diluted to 20 g. with water. 1.61 g. (product weight) of Acrysol® ASE-60 crosslinked acrylic emulsion copolymer with an AEWS value of 215 was diluted to 230.0 g. with water. This mixture was stirred at low shear (low setting on a Waring Blender or 1,000 rpm on a cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The sodium hydroxide solution was then added and the slurry was mixed at low shear for 30 seconds. The viscosity and test results appear in Table I.

EXAMPLE 4

Slurry 4: 1.97 g. of 10% (by weight) sodium hydroxide was diluted to 20 g. with water. 1.61 g. (solids basis) of alkali-soluble acrylic emulsion copolymer of ethyl acrylate and methacrylic acid and an AEWS value of 132, was diluted to 230.0 g. with water. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The sodium hydroxide solution was then added and the slurry was mixed at low shear for 30 seconds. The viscosity and test results appear in Table I.

EXAMPLE 5

Slurry 5: 1.97 g. of 10% (by weight) sodium hydroxide was diluted to 20 g. with water. 1.61 g. (product weight) of a 0.03% by weight crosslinked alkali-soluble acrylic emulsion copolymer of ethyl acrylate and methacrylic acid and an AEWS value of 132, was diluted to 230.0 g. with water. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The sodium hydroxide solution was then added and the slurry was mixed at low shear for 30 seconds. The viscosity and test results appear in Table I.

TABLE I

| Slurry | Dosage (%)[1] | Initial Viscosity Low[2] (cps) | Initial Viscosity High[3] (rpm) | Flowability (%)[4] | Comments |
|---|---|---|---|---|---|
| 1 | .26* .15** | 486 | 455 | 96.4 | Some soft settled |
| 2 | .15 | 590 | 243 | not available | Gelled |
| 3 | .18 | 486 | 570 | 96.8 | Some soft settled |
| 4 | .20 | 354 | n/a | 98.1 | Coating on walls |
| 5 | .18 | 1060 | 505 | 98.1 | Poured clean |

[1] Polymer solids on a clay solids basis.
[2] Brookfield RVT, #2, 20 rpm, 23° C.
[3] 100,00 dyne cm/cm, 1100 rpm max, 'A' bob, 23° C. - rpm to 16 cm.
[4] Percent of slurry (by weight) that flows from an inverted container in 2.0 minutes. Measurments taken after remaining idle for seven days under ambient conditions. Average of two measurements.
*Homopolymer of acrylic acid, 3,000 molecular weigth.
**Carboxy methylcellulose.

Table I shows a comparison of the slurries of the present invention with respect to the method of preparing a stable dispersion of calcined clay as taught in U.S. Pat. No. 4,374,203, wherein a dispersed calcined clay slurry was made using carboxymethyl cellulose and polyacrylic acid having a molecular weight of 3,000 and an AEWS value of 72, as the polymeric dispersant (slurry of Example 1). The slurry of Example 2 (control) represents a non-dispersed calcined clay slurry which makes use of carboxymethyl cellulose as the only stabilizer, without the addition of any dispersing agent. The slurry of Example 3 illustrates the effect of a low charge density stabilizer alone in a non-dispersed calcined clay slurry. The slurry of Example 4 is a slurry of the invention resulting from the use of a high charge density stabilizer in a non-dispersed calcined clay slurry, and the slurry of Example 5 was a slurry of the invention resulting from the use of a crosslinked high charge density stabilizer in a non-dispersed calcined clay slurry.

The results which appear in Table I show that the use of alkali-soluble acrylic emulsion copolymers with high charge density (low AEWS values) as stabilizers in calcined clay slurries give better performance with regard to dilatant settling than the stabilized systems previously known. Both the crosslinked and non-crosslinked stabilizers used to make the slurries resulted in comparable high shear viscosity values and better flowability values as compared to the dispersed system. As a control measure, the slurry made with carboxymethyl cellulose as a stabilizer failed to provide any stability to the slurry as indicated by the fact that the slurry gelled.

Table II presents comparisons between dispersed calcined slurries made with different alkali-soluble acrylic emulsion copolymers. Each of the sets of data also compare the results of calcined clay slurries made with and without said copolymers.

The calcined clay slurries appearing in Table II were made in the following way. The aqueous phase was prepared by mixing together the appropriate amount of a 1% (solids basis) copolymer solution to yield the desired dosage, sufficient base solution, NaOH (10% by weight), to equal 1.2 equivalents of base per equivalent of acid functionality contained in the added copolymer, an appropriate amount of dispersant, and enough water to yield 250 g. of solution. In the control experiments, where no stabilizer was added, the appropriate amount of dispersant was diluted to 250 g. with water and the pH was adjusted with a 10% (weight basis) sodium hydroxide solution after addition of the clay. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The results appear in Table II.

When used in dispersed calcined clay slurries, high charge density alkali soluble acrylic emulsion copolymers also show an increase in performance over the prior art as indicated by the data appearing in Table II. Whether the slurries were dispersed with sodium hexametaphosphate or a 3,000 molecular weight homopolymer of acrylic acid, when they were stabilized with the higher charge density alkali-soluble acrylic emulsion copolymers, the stability of the slurries was enhanced.

EXAMPLE 6

Slurry 8: To 196.0 g. water was added 37.5 g (1% solids basis) of a 0.03% by weight crosslinked alkali-soluble acrylic emulsion copolymer of ethyl acrylate and methacrylic acid with an AEWS value of 132, 1.50 g. NaOH (weight basis) and 0.83 g. sodium hexametaphosphate. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The results appear in Table II.

EXAMPLE 7 (COMPARATIVE)

Slurry 12: To 196.0 g. water was added 50.0 g (1% solids basis) of Acrysol® ASE-60 crosslinked acrylic emulsion copolymer, an alkali-soluble acrylic emulsion copolymer with an AEWS value of 215, 1.10 g. NaOH (weight basis) and 0.83 g. sodium hexametaphosphate. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The results appear in Table II.

EXAMPLE 8

Slurry 17: To 196.0 g. water was added 50.0 g (1% solids basis) of an alkali-soluble acrylic emulsion copolymer of ethyl acrylate and methacrylic acid with an AEWS value of 132, 1.94 g. NaOH (weight basis) and 0.83 g. sodium hexametaphosphate. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The results appear in Table II.

EXAMPLE 9

Slurry 25: To 196.0 g. water was added 50.0 g (1% solids basis) crosslinked alkali-soluble acrylic emulsion copolymer of ethyl acrylate and methacrylic acid with an AEWS value of 132, 1.94 g. NaOH (weight basis) and 0.60 g. (solids basis) sodium salt of a homopolymer of acrylic acid having a molecular weight of 3,000. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The results appear in Table II.

EXAMPLE 10 (COMPARATIVE)

Slurry 28: To 246.0 g. water was added 1.94 g. NaOH (weight basis) and 0.60 g. (solids basis) sodium salt of a homopolymer of acrylic acid having a molecular weight of 3,000. This mixture was stirred at low shear (low setting on a Waring Blender or 1,000 rpm on a Cowles mixer) and 250 g. of calcined kaolin clay was added slowly while mixing. After addition of the clay was complete, the slurry was stirred at high shear (high setting on a Waring Blender or 3,000 rpm on a Cowles mixer) for a sufficient time to achieve a homogeneous slurry. The results appear in Table II.

TABLE II

| Slurry | Clay Lot | Stabilizer[1] | Dosage % | Dispersant* | pH | Ambient Stability Syneresis % | Slurry % | Hard Pack % | Flowability (%)/ # Days Ambient |
|---|---|---|---|---|---|---|---|---|---|
| 6 | A | Acrysol® ASE-60 | 0.10 | A | 7.0 | 20 | 46 | 34 | p/28 |
| 7 | A | Acrysol® ASE-60 | 0.15 | A | 7.1 | 19 | 46 | 34 | 56/28 |
| 8 | A | Acrysol® ASE-60 | 0.20 | A | 7.1 | 14 | 75 | 10 | 79/28 |
| 9 | A | Copolymer B | 0.15 | A | 7.3 | 4 | 96 | 0 | 95/28 |
| 10 | A | none | 0.00 | A | 6.7 | 20 | 60 | 20 | p/28 |
| 11 | B | Acrysol® ASE-60 | 0.15 | A | 7.0 | 21 | 46 | 33 | not available |
| 12 | B | Acrysol® ASE-60 | 0.20 | A | 7.0 | 16 | 67 | 17 | not available |
| 13 | B | Copolymer B | 0.15 | A | 7.0 | 11 | 85 | 4 | not available |
| 14 | B | Copolymer B | 0.20 | A | 7.2 | 2 | 93 | 5 | not abailable |
| 15 | B | none | 0.00 | A | 6.3 | 22 | 42 | 36 | not available |
| 16 | A | Copolymer A | 0.20 | A | 7.8 | 10 | 88 | 2 | 87/28 |
| 17 | A | Copolymer A | 0.20 | A | 7.4 | 12 | 87 | 2 | 85/28 |
| 18 | A | Copolymer B | 0.20 | A | 7.9 | 7 | 92 | 1 | 89/28 |
| 19 | A | none | 0.00 | A | 7.1 | | Unstable | | 36/28 |
| 20 | C | Acrysol® ASE-60 | 0.20 | B | 7.7 | 1 | 93 | 6 | 88/7 |
| 21 | C | Acrysol® ASE-60 | 0.20 | B | 7.5 | 1 | 86 | 12 | 76/7 |
| 22 | C | Acrysol® ASE-60 | 0.20 | B | 7.3 | 1 | 86 | 12 | 70/7 |
| 23 | C | Copolymer A | 0.20 | B | 7.6 | 1 | 97 | 3 | 96/7 |
| 25 | C | Copolymer B | 0.20 | B | 7.6 | 1 | 97 | 1 | 90/7 |
| 26 | C | Copolymer B | 0.20 | B | 7.3 | 1 | 97 | 1 | 92/7 |
| 27 | C | Copolymer B | 0.20 | B | 7.2 | 1 | 97 | 3 | 92/7 |

TABLE II-continued

| Slurry | Clay Lot | Stabilizer[1] | Dosage % | Dispersant* | pH | Ambient Stability Syneresis % | Slurry % | Hard Pack % | Flowability (%)/ # Days Ambient |
|---|---|---|---|---|---|---|---|---|---|
| 28 | C | none | 0.00 | B | 8.0 | 11 | 57 | 32 | 65/7 |

[1]Copolymer A is a copolymer of ethyl acrylate and methacrylic acid and an AEWS value of 132. Copolymer B is a copolymer of a 0.03% by weight crosslinked alkali-soluble acrylic emulsion copolymer of ethyl acrylate and methacrylic acid and an AEWS value of 132
*Dispersant A is sodium hexametaphosphate. Dispersant B is a homopolymer of acrylic acid having molecular weight of 3,000
**Viscosity is measured in cps at 23° C.
p indicated flowability was poor

TABLE III

| Clay Solids, % | Stabilizer Dosage, %[1] | Ambient Stability Syneresis | Slurry | Hard Pack | Flow-able[2] |
|---|---|---|---|---|---|
| 10 | 0.20 | 85.4 | 12.2 | 2.4 | 86.2 |
| 20 | 0.2 | 64.6 | 19.6 | 15.8 | 69.2 |
| 20 | 1.00 | 0 | 100 | trace | 98.3 |
| 30 | 0.2 | 20.2 | 61.8 | 18.0 | 74.6 |
| 40 | 0.2 | 6.2 | 92.5 | 1.3 | 98.2 |
| 50 | 0.2 | 1.4 | 98.6 | 0 | 98.1[3] |
| 52 | 0.2 | 1.6 | 88.7 | 9.7 | 80.1 |
| 50 | 0.3 | 1.5 | 98.5 | 0 | 97.6[3] |
| 50 | 0.4 | 0 | 100 | 0 | 96.3[3] |

[1]Stabilizer is a copolymer of an acrylic emulsion copolymer of ethyl acrylate and methacrylic acid with an AEWS value of 132. Percent by weight based on clay solids.
[2]Percent of slurry (by weight) that flows from and inverted container in 2.0 minutes. Measurements taken after remaining idle for seven days under ambient conditions.
[3]Residual Slurry in container is due to coating on the walls of the container due to the high viscosity of the slurry; it is not due to hard-pack solids.

The data appearing in Table III indicate the range over which an alkali-soluble acrylic emulsion copolymer with a low AEWS value is effective at stabilizing calcined clay slurries. Stable slurries were maintained over a wide range of clay solids, from 10% to 52%. Also, the copolymers used in the slurries of this invention proved effective at stabilizing the slurries at levels of up to 1% polymer solids on a clay solids basis.

We claim:

1. A stable suspension comprising at least 10% by weight of calcined clay in an aqueous medium in the presence of 0.05% to 1.0% by weight of an anionic emulsion copolymer having an AEWS value less than 200.

2. The stable suspension of claim 1 wherein the concentration in the suspension of the anionic emulsion copolymer having an AEWS value less than 200 is from about 0.10% to about 0.25% by weight.

3. The stable suspension of claim 1 wherein the concentration in the suspension of the anionic emulsion copolymer having an AEWS value less than 200 is 0.20% by weight.

4. The stable suspension of calcined clay as claimed in claim 1 wherein the anionic emulsion copolymer is an emulsion copolymer of 35% ethyl acrylate and 65% methacrylic acid.

5. The stable suspension of calcined clay as claimed in claim 1 wherein the anionic emulsion copolymer is a 0.03% by weight crosslinked acrylic emulsion copolymer of 35% ethyl acrylate and 65% methacrylic acid.

6. A stable dispersion comprising at least 10% by weight of calcined clay in an aqueous medium in the presence of a dispersing agent selected from the group consisting of polyacrylic acid, sodium hexametaphosphate, sodium tripolyphosphate, tetrasodium pyrophosphate, sodium silicate, anionic polymers, anionic surfactants, nonionic surfactants, citric acid and salts thereof, ascorbic acid and salts thereof, alkali and alkanolamine soaps of fatty acids, and combinations thereof, and from about 0.05% to about 1.0% by weight of an anionic emulsion copolymer having an AEWS value less than 200.

7. The stable dispersion of claim 6 wherein the concentration in the dispersion of anionic emulsion copolymer having an AEWS value less than 200 is from about 0.10% to about 0.25% by weight.

8. The stable dispersion of claim 6 wherein the concentration in the dispersion of anionic emulsion copolymer having an AEWS value less than 200 is 0.20% by weight.

9. The stable dispersion of calcined clay as claimed in claim 6 wherein the anionic emulsion copolymer is an acrylic emulsion copolymer of 35% ethyl acrylate and 65% methacrylic acid.

10. The stable dispersion of calcined clay as claimed in claim 6 wherein the anionic emulsion copolymer is a 0.03% by weight crosslinked acrylic emulsion copolymer of 35% ethyl acrylate and 65% methacrylic acid.

11. A process for making a stable calcined clay suspension which comprises
    (a) dissolving in water an anionic emulsion copolymer having an AEWS value of less than 200;
    (b) adding at least 10% by weight of calcined clay to the solution with agitation to provide a suspension; and
    (c) adjusting the pH of the suspension to about pH 6 to about pH 8.

12. The process as claimed in claim 11 wherein the anionic emulsion copolymer is present at from about 0.05% to about 1.0%.

13. The process as claimed in claim 11 wherein the anionic emulsion copolymer is present at from about 0.1% to about 0.25%.

14. The process as claimed in claim 11 wherein the anionic emulsion copolymer has an AEWS value of less than 200 and is present at 0.2%.

15. The process as claimed in claim 11 wherein the anionic emulsion copolymer is an acrylic emulsion copolymer of 35% ethyl acrylate and 65% methacrylic acid.

16. The process as claimed in claim 11 wherein the anionic emulsion copolymer is a 0.03% by weight crosslinked acrylic emulsion copolymer of 35% ethyl acrylate and 65% methacrylic acid.

17. A process for making a stable calcined clay dispersion which comprises:
    (a) dissolving a dispersant and an anionic emulsion copolymer in water
    (b) adding at least 10% by weight of calcined clay to the solution with agitation to provide a dispersion; and
    (c) adjusting the pH of the dispersion to about pH 6 to about pH 8.

18. The process as claimed in claim 17 wherein the anionic emulsion copolymer has an AEWS value of less than 200 and is present at from about 0.05% to about 1.0%.

19. The process as claimed in claim 17 wherein the anionic emulsion copolymer has an AEWS value of less than 200 and is present at from about 0.1% to about 0.25%.

20. The process as claimed in claim 17 wherein the anionic emulsion copolymer has an AEWS value of less than 200 and is present at 0.20%.

21. The process as claimed in claim 17 wherein the anionic emulsion copolymer is an acrylic emulsion copolymer of 35% ethyl acrylate and 65% methacrylic acid.

22. The process as claimed in claim 17 wherein the anionic emulsion copolymer is a 0.03% by weight crosslinked acrylic emulsion copolymer of 35% ethyl acrylate and 65% methacrylic acid.

23. A paper coating made from a stable calcined clay slurry wherein said slurry is a suspension or dispersion using from 0.05% to 1.0% by weight of anionic emulsion copolymer having an AEWS of less than 200.

24. The paper coating as claimed in claim 23 wherein the anionic emulsion copolymer is a crosslinked acrylic emulsion copolymer having an AEWS of less than 200.

* * * * *